United States Patent
Haggerty et al.

(10) Patent No.: US 11,797,490 B2
(45) Date of Patent: *Oct. 24, 2023

(54) MULTI-CLOUD BI-DIRECTIONAL STORAGE REPLICATION SYSTEM AND TECHNIQUES

(71) Applicant: Capital One Services, LLC, McLean, VA (US)

(72) Inventors: Timothy Haggerty, Henrico, VA (US); Steven Long, Henrico, VA (US); Deepa Rao, Plano, TX (US); Eric Henry, Fairfax, VA (US); Yuting Zhou, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/355,929

(22) Filed: Jun. 23, 2021

(65) Prior Publication Data

US 2021/0318991 A1    Oct. 14, 2021

Related U.S. Application Data

(63) Continuation of application No. 16/826,493, filed on Mar. 23, 2020, now Pat. No. 11,068,446, which is a
(Continued)

(51) Int. Cl.
*H04L 9/40* (2022.01)
*G06F 21/62* (2013.01)
(Continued)

(52) U.S. Cl.
CPC .......... *G06F 16/178* (2019.01); *G06F 21/602* (2013.01); *G06F 21/6218* (2013.01);
(Continued)

(58) Field of Classification Search
None
See application file for complete search history.

(56) References Cited

U.S. PATENT DOCUMENTS 8,578,076 B2 * 11/2013 van der Linden ...... H04L 69/08
709/227
9,128,626 B2 * 9/2015 Chacko ................. G06F 3/0665
(Continued)

*Primary Examiner* — Michael Pyzocha
(74) *Attorney, Agent, or Firm* — KDW Firm PLLC

(57) ABSTRACT

Disclosed are systems, apparatuses and techniques for replicating data between different cloud computing platforms. Examples include storage replicator components operable in different cloud computing platforms. The first storage replicator component may identify the second cloud computing platform as a location to copy a data file in response to an event related to the data file stored in a first cloud computing platform. The first storage replicator component may request a copy of the data file via an application programming interface of the first cloud computing platform. The attributes of the copy of the data file which involve modification to conform to data management conventions of the second cloud computing platform may be determined and modified to comply with conventions of the second cloud computing platform. The modified copy of the data file may be forwarded to the second cloud computing platform for storage.

20 Claims, 5 Drawing Sheets

Related U.S. Application Data continuation of application No. 16/408,425, filed on May 9, 2019, now Pat. No. 10,635,642.

(51) Int. Cl.
*G06F 21/60* (2013.01)
*G06F 16/178* (2019.01)
*H04L 67/1095* (2022.01)
*H04L 67/1097* (2022.01)
*H04L 67/06* (2022.01)

(52) U.S. Cl.
CPC .......... *H04L 63/0428* (2013.01); *H04L 63/08* (2013.01); *H04L 67/06* (2013.01); *H04L 67/1095* (2013.01); *H04L 67/1097* (2013.01)

(56) References Cited

U.S. PATENT DOCUMENTS

| | | | | |
|---|---|---|---|---|
| 9,477,737 | B1* | 10/2016 | Charyk | H04L 63/0815 |
| 10,154,112 | B1* | 12/2018 | Anthony | G06F 3/0647 |
| 10,289,310 | B2* | 5/2019 | Xu | G06F 3/0643 |
| 2010/0199042 | A1* | 8/2010 | Bates | H04L 9/0625 |
| | | | | 711/135 |
| 2010/0332401 | A1* | 12/2010 | Prahlad | G06F 3/0631 |
| | | | | 711/E12.001 |
| 2011/0208695 | A1* | 8/2011 | Anand | G11B 27/002 |
| | | | | 707/610 |
| 2013/0110967 | A1* | 5/2013 | Ueoka | G06F 16/185 |
| | | | | 709/214 |
| 2014/0006350 | A1* | 1/2014 | Fukui | G06F 16/178 |
| | | | | 707/632 |
| 2014/0067994 | A1* | 3/2014 | Puttaswamy Naga | H04L 67/10 |
| | | | | 709/217 |
| 2014/0122886 | A1* | 5/2014 | Lee | G06F 21/00 |
| | | | | 709/213 |
| 2014/0181025 | A1* | 6/2014 | Castro | G06F 16/184 |
| | | | | 707/634 |
| 2014/0201145 | A1* | 7/2014 | Dorman | G06F 16/27 |
| | | | | 707/634 |
| 2014/0245026 | A1* | 8/2014 | Bates | G06F 3/065 |
| | | | | 713/190 |
| 2014/0304505 | A1* | 10/2014 | Dawson | G06F 21/6227 |
| | | | | 713/165 |
| 2014/0366155 | A1* | 12/2014 | Chang | H04L 67/1097 |
| | | | | 726/27 |
| 2015/0154418 | A1* | 6/2015 | Redberg | H04L 9/0631 |
| | | | | 713/165 |
| 2015/0370827 | A1* | 12/2015 | Parkison | G06F 16/178 |
| | | | | 707/610 |
| 2016/0021186 | A1* | 1/2016 | de Sene | H04L 67/1097 |
| | | | | 709/213 |
| 2016/0036822 | A1* | 2/2016 | Kim | G06F 21/6236 |
| | | | | 726/4 |
| 2016/0080501 | A1* | 3/2016 | Freimuth | H04L 67/141 |
| | | | | 709/228 |
| 2016/0094483 | A1* | 3/2016 | Johnston | H04L 47/827 |
| | | | | 709/226 |
| 2016/0196320 | A1* | 7/2016 | Borowiec | G06F 3/065 |
| | | | | 707/624 |
| 2016/0337473 | A1* | 11/2016 | Rao | H04L 41/0813 |
| 2017/0006099 | A1* | 1/2017 | Kazi | H04L 67/06 |
| 2017/0195401 | A1* | 7/2017 | Shin | H04L 67/06 |
| 2017/0235805 | A1* | 8/2017 | Shetty | G06F 16/178 |
| | | | | 707/634 |
| 2017/0244593 | A1* | 8/2017 | Rangasamy | H04L 12/4683 |
| 2017/0262345 | A1* | 9/2017 | Wang | G06F 11/1469 |
| 2017/0329677 | A1* | 11/2017 | Crofton | G06F 16/2455 |
| 2018/0196832 | A1* | 7/2018 | Maybee | G06F 21/602 |
| 2018/0349238 | A1* | 12/2018 | Boshev | G06F 11/2023 |
| 2019/0163763 | A1* | 5/2019 | Pandey | G06F 11/301 |
| 2019/0182322 | A1* | 6/2019 | Kumar | G06F 3/0647 |
| 2019/0182323 | A1* | 6/2019 | Srinivasan | G06Q 10/0635 |
| 2019/0266277 | A1* | 8/2019 | Lautenschlaeger | G06F 16/2322 |
| 2019/0332494 | A1* | 10/2019 | Natanzon | G06F 11/1448 |
| 2020/0167177 | A1* | 5/2020 | Mahajan | H04L 9/30 |

* cited by examiner

400

410 — RECEIVE THE ENCRYPTED MODIFIED DATA FILE FORWARDED FROM THE FIRST CLOUD COMPUTING PLATFORM

420 — AUTHENTICATE THE FIRST STORAGE REPLICATOR COMPONENT OR FIRST CLOUD COMPUTING PLATFORM VIA AN APPLICATION PROGRAMMING INTERFACE OF THE SECOND CLOUD COMPUTING PLATFORM

430 — DECRYPT THE ENCRYPTED MODIFIED DATA FILE COPY FORWARDED FROM THE FIRST CLOUD COMPUTING PLATFORM

440 — STORE THE MODIFIED DATA FILE IN DATA STORAGE OF THE SECOND CLOUD COMPUTING PLATFORM

450 — FORWARD A MESSAGE TO THE CUSTOMER NETWORK PLATFORM INDICATING THE MODIFIED DATA FILE WAS SUCCESSFULLY STORED IN THE SECOND CLOUD COMPUTING PLATFORM

FIG. 4

MULTI-CLOUD BI-DIRECTIONAL STORAGE REPLICATION SYSTEM AND TECHNIQUES

RELATED APPLICATIONS

This application is a continuation of U.S. patent application Ser. No. 16/826,493, filed Mar. 23, 2020, which is a continuation of U.S. patent application Ser. No. 16/408,425 (now U.S. Pat. No. 10,635,642), filed May 9, 2019, both titled "MULTI-CLOUD BI-DIRECTIONAL STORAGE REPLICATION SYSTEM AND TECHNIQUES". The contents of the aforementioned applications are incorporated herein by reference in their entirety.

TECHNICAL FIELD

Embodiments herein generally relate to cloud computing platforms or platforms, and more specifically, to replicating data between cloud computing platforms or platforms.

BACKGROUND

The use of cloud computing platforms has rapidly increased in the past several years. The cloud computing platforms, such as Amazon AWS, IBM Cloud, Google Cloud Platform, Microsoft Azure and the like, provide a number of services that allows companies to minimize initial information technology infrastructure expenses and also enable companies to adjust resources to meet unpredictable demand fluctuations.

An enterprise user may utilize more than one cloud computing platform to mitigate the remote chance that a particular cloud computing platform may suffer a failure or an even a catastrophic failure, and all of the enterprises data and or services may be lost. Also, depending upon the geographic locations of a cloud computing platforms, the enterprise may use multiple different cloud computing platform providers to allow for expansion of service when one geographic region experiences greater and perhaps unanticipated usage as compared to a cloud computing platform located thousands of miles away.

Experience with the cloud computing platforms offered by different providers shows that data may easily be input into a respective cloud computing platform; however, extracting the data and storing it into another provider's cloud computing platform may be challenging. Challenges particularly arise when a user wishes to copy less than all of the data stored on a data storage disk in one could computing platform and transfer the copied data to another provider's cloud computing platform.

Present cloud computing platforms commonly store data in files or records on a data storage disk maintained by the cloud computing provider. In an e-commerce example, the data stored in a respective file may be product data, vendor data, customer data, enterprise data or the like. The data files or records, which may number into the hundreds-of-thousands or millions of files, may consume several data storage disks on multiple different servers. When an enterprise user desires to copy data from the data storage disks in the cloud computing platform, the enterprise user must often use copy an entire data storage disk that contains the data that the enterprise user is interested in copying. Even if the enterprise user desires to only copy a small number of data files, the enterprise user is typically required to copy the entire data storage disk, using a "block copy." As a result, the time required to make the data transfer increases as well as might the cost as resources are used for longer periods of time, more data is transferred and exposed to potential loss, and more data storage space in the new cloud computing platform that is receiving the copied data must be used.

The data replication services existing on most cloud computing platforms commonly utilize the less secure internet small computer systems interface (iSCSI), a standard for internet protocol-based storage networking standard for linking data storage facilities.

Moreover, often times it is not as easy to simply copy data from one cloud computing platform and simply store the copied data to the new cloud computing platform because the new cloud computing platform may have different data conventions and formatting than the previous cloud computing platform from which the data is being copied. So not only does an excessive amount of data have to be transferred but the data that is not of interest typically must also be converted for storage in the new cloud computing platform.

Therefore, improvements that overcome the above inefficiencies of the present cloud computing platforms would be beneficial and advantageous to a number of cloud computing platform customers and/or users.

SUMMARY

Examples disclosed herein provide systems, methods, and computer-readable media for replicating data between cloud computing platforms or platforms.

An example of a method is disclosed. The method includes steps of identifying, by a first storage replicator component operable in the first cloud computing platform, a second cloud computing platform in response to an event related to a data file stored in a first cloud computing platform. The event may indicate a change to an attribute of the data file. A copy of the data file may be requested by the first storage replicator component via an application programming interface of the first cloud computing platform. The attributes of the copy of the data file which involve modification to conform to data management conventions of the second cloud computing platform may be determined. While copying the data file, the determined attributes of the copy of the data file may be modified to comply with the conventions of the second cloud computing platform. The modified copy of the data file may be encrypted. The encrypted, modified copy of the data file may be forwarded to the second cloud computing platform for storage.

Also disclosed is a system including a data network, a customer network platform and a number of cloud computing platforms. The data network may be operable to facilitate the exchange of data. The customer network platform may be communicatively coupled to the data network and operable to perform a number of functions for a customer entity. The number of cloud computing platforms may be coupled to the customer network platform via the data network. Each respective cloud computing platform of the plurality of cloud computing platforms may be operable to perform functions via one or more respective application programming interfaces of each respective cloud computing platform. Each respective cloud computing platform may include a respective storage replicator component operating as a serverless function operable to provide data replication services and may have a same customer and each respective storage replicator component is associated with the customer. A first storage replicator component in a first respective cloud computing platform of the plurality of cloud computing platforms may be operable to perform functions. The functions may include accessing a file copy application programming interface provided by the first respective cloud computing platform in response to an event related to a data file stored in a data storage of the first respective cloud computing platform. The first storage replicator component may determine that the data file is to be replicated to a second respective cloud computing platform. A rules engine may be utilized to determine which attributes of the data file require modification to comply with data conventions of the second respective cloud computing platform. Based on an output of the rules engine, the data file may be modified to conform with the data conventions of the second respective cloud computing platform. The modified data file may be forwarded via the data network from the first respective cloud computing platform to the second respective cloud computing platform.

An example of a computer readable medium is also provided. The non-transitory computer readable medium embodying programming code that when executed by at least one processor causes the at least one processor to perform functions. The functions include detecting, by a first storage replicator component, an event related to a data file stored on a first cloud computing platform. Based on the detected event, a second cloud computing platform may be identified from a number of other cloud computing platforms. The at least one processor may request, via a file copy application programming interface of the first cloud computing platform, a copy of the data file stored on the first cloud computing platform is generated through an application programing interface related to a copy of the data file function. The at least one processor may obtain the requested copy of the data file. A copy container executing in the first cloud computing platform may determine which attributes of the requested copy of the data file require modification to conform to data management conventions of the second cloud computing platform. The determined attributes of the copy of the data file may be modified to comply with the conventions of the second cloud computing platform and generate a modified copy of the data file. The modified copy of the data file may be encrypted. The encrypted, modified requested copy of the data file may be forwarded in a transmission to the second cloud computing platform.

BRIEF DESCRIPTION OF THE DRAWINGS

FIG. 4 shows a flow chart of an example of a process for copying data and transferring the copied data to other cloud computing platforms.

DETAILED DESCRIPTION

Figure 1:
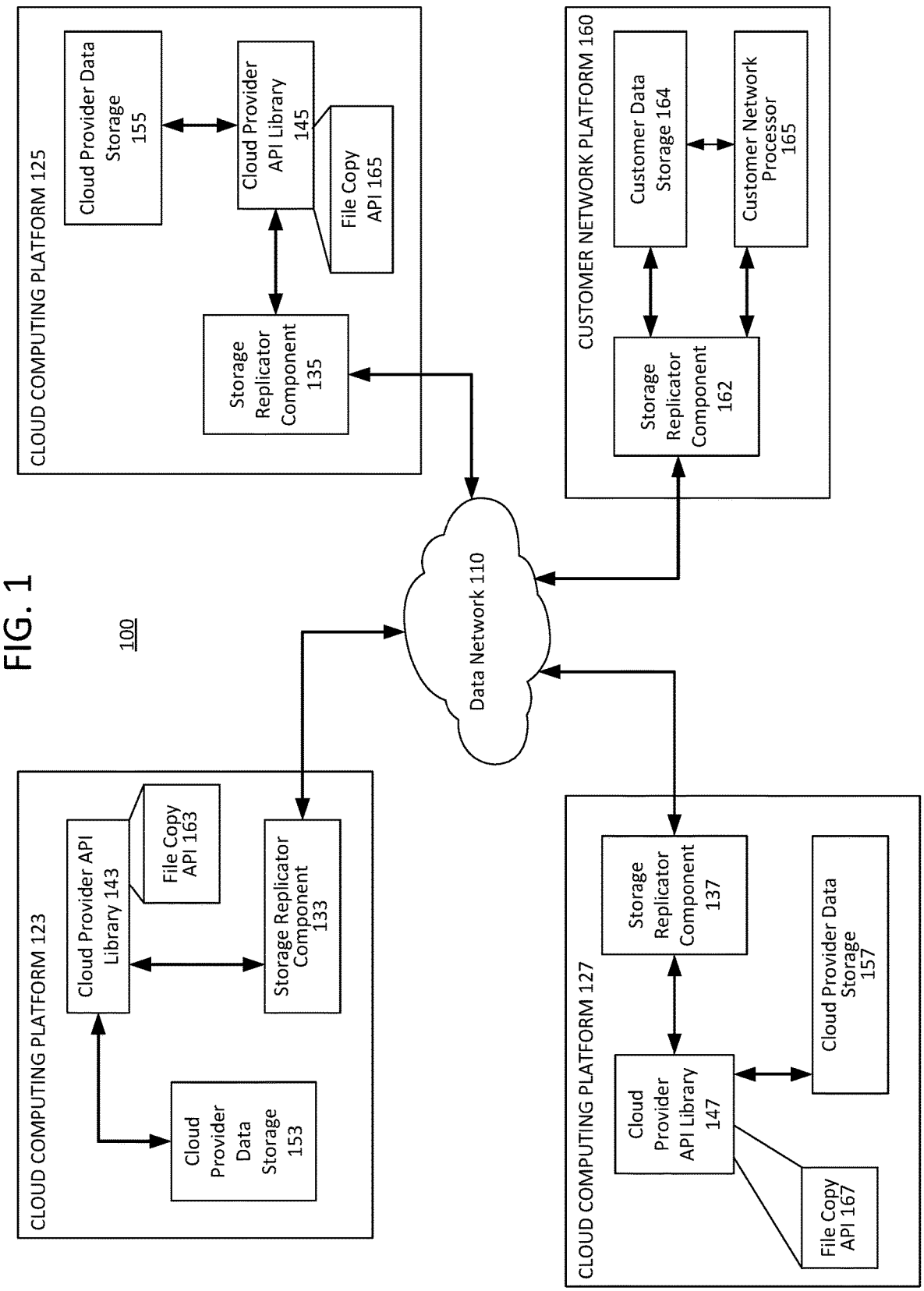
FIG. 1 illustrates an example of an implementation of a system for transferring data, including copied data, between multiple cloud computing platforms.

Examples disclosed herein provide a system, an apparatus and techniques for replicating data between cloud computing platforms or platforms.

The following examples illustrate improvements to the cloud computing platforms with respect to replicating data that overcome the above described problems with prior cloud computing platforms. In particular, the described examples provide a system, an apparatus and techniques that enable a cloud computing customer to replicate data, such as specific data within a data storage disk and not the entirety of data on the storage disk, between cloud computing platforms or platforms, and to also convert the data, if necessary, according to the conventions and formatting requirements of the target cloud computing platform (i.e., the cloud computing platform where the copied data will be stored).

Advantageously, the disclosed examples provide an improved capability for a cloud computing platform that reduces the amount of data transferred (or exposed to interception or loss), the time and cloud computing resources required to transfer the data, convert the data, and finally store the data in the new data storage of the new could computing platform. Additional advantages, such as the capability to copy data between public and private cloud computing providers that leverages existing application programming interface (API) capabilities but also adds missing capabilities through custom functionality to handle differences between cloud computing providers, and by adding reversible data copy capabilities that are not available from all cloud computing providers. For example, the described examples include techniques to compress and encrypt data, split the data to be copied into manageable chunks of data, and enables the data to be copied in parallel.

In addition, the improvements enable folder and file irregularities to be corrected using, for example, a rules engine or similar approach. Examples disclose techniques and apparatuses operable to convert data from varying formats and convert to a generic file format for copying and attaining high levels of throughput using highly parallel threads and treating all data objects as offsite copies and not real-time copies. The utilization of offsite copies allows copying of parts of the file in an order that is more efficient, as opposed to real-time copying which is less efficient because it requires data to be transferred in a predetermined order, regardless of transport efficiency.

With general reference to notations and nomenclature used herein, one or more portions of the detailed description which follows may be presented in terms of program processes executed on a computer or network of computers. A process is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which may be associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel examples can be practiced without these specific details. In other instances, well-known structures and devices are shown in block diagram form to facilitate a description thereof. The intention is to cover all modification, equivalents, and alternatives within the scope of the claims.

FIG. 1 is an example of an implementation of a system for monitoring data quality. An enterprise may be a commercial, governmental, or another type of entity that interacts with and provides services to users (i.e. clients or customers). The enterprise may be a customer to a number of cloud computing platforms, both private and public, that the enterprise uses to maintain data and provide services The system 100 may include a data network 110, a customer network platform 160 and a number of cloud computing platforms 123, 125, and 127. The data network 110 may be operable to facilitate the exchange of data between the respective cloud computing platforms 123, 125 and 127. For example, the customer network platform 160 may be communicatively coupled to the data network 110 and operable to perform a number of functions, such as providing services, processing data and the like, for a customer entity, such as an enterprise. The customer network platform 160 may include a storage replicator component 162, a customer data storage 164, and a customer network processor 165. The replicator component 162 may respond to commands from the customer network processor 165 to provide data requests to a respective storage replicator component, such as 133, 135 or 137 operating in a respective cloud computing platform 123, 125 or 127.

The number of cloud computing platforms 123, 125 and 127 may also be communicatively coupled to the customer network platform via the data network 110. The cloud computing platforms 123, 125 and 127 may be any one of the public computing platforms, such as Amazon AWS, Google cloud platform (GPC), IBM cloud, Microsoft Azure or the like. Alternatively, the cloud computing platforms 123, 125 and 127 may be private cloud computing platforms. A private cloud computing platform may provide similar functions as a public cloud computing platform, but only for use by a limited number of customers. For example, an enterprise may wish to have all of its information technology infrastructure hosted in a cloud computing platform, such as 123, 125 or 127 to reduce costs, more easily manage hardware assets, and provide consistent capabilities and services across the enterprise. In addition, the enterprise may wish to either distribute or duplicate its information technology infrastructure across the multiple cloud computing platforms 123, 125 or 127 for purposes of load distribution, redundancy, failure mitigation or the like.

Each respective cloud computing platform 123, 125 or 127 may be operable to perform event monitoring and data replication functions via one or more respective application programming interfaces within a cloud provider application programming interface (API) library present in each respective cloud computing platform. Events monitored by the cloud computing platforms 123, 125 or 127 may include one or more of: when a data file is created, a data file is updated, a data file is modified, a data file is sent to an addressed storage location for storage, an indication of a need to back up a data file from the first respective cloud computing platform and the second respective cloud computing platform, or an indication of a need to load balance between the first respective cloud computing platform and the second respective cloud computing platform. The event may be related to a respective cloud computing platform of a number of cloud computing platforms, including a first respective cloud computing platform and a second respective cloud computing platform.

Each respective cloud computing platform 123, 125 and 127 may include a respective storage replicator component such as 133, 135 and 137, respectively, a cloud provider application programming interface (API) library 143, 145 and 147, respectively, and a cloud provider data storage 153, 155 and 157, respectively. Each cloud provider API library 143, 145 and 147 may respectively include at least a file copy API 163, 165 and 167.

Each respective storage replicator component 133, 135 and 137 may operate as a serverless function within the respective cloud computing platform 123, 125 and 127 operable to provide data replication services. Each cloud computing platform 123, 125 and 127 may all provide services to the same customer (i.e., customer network platform 160) and each respective storage replicator component is associated with the customer and may receive instructions via a customer network platform, such as 160 in FIG. 1.

A first storage replicator component, such as 123, 125 or 127, may be a serverless function that is uploaded to the respective cloud computing platform 123, 125 or 127 for use by the customer network platform 160. For example, the storage replicator component 135 may be operable to perform functions, such as accessing a file copy application programming interface (API) provided, via the cloud provider API library 145 by the respective cloud computing platform 125 in response to an event related to a data file stored in the cloud provider data storage 155. Storage replicator components 133 and 137 may be operable to perform similar functions as storage replicator component 135.

In an example, upon accessing the file copy application programming interface, such as 163, 165 or 167 from a respective cloud provider API library 143, 145 or 147, a first respective storage replicator component, such as 135, may be further operable to obtain authentication credentials of the customer associated with the customer network platform 160 and authenticate the customer based on the obtained authentication credentials. Authentication is discussed in more detail with reference to FIG. 2.

It may be helpful to provide a more specific discussion of a storage replicator component and the data replication functions that may be performed by the elements within system 100.

Figure 2:
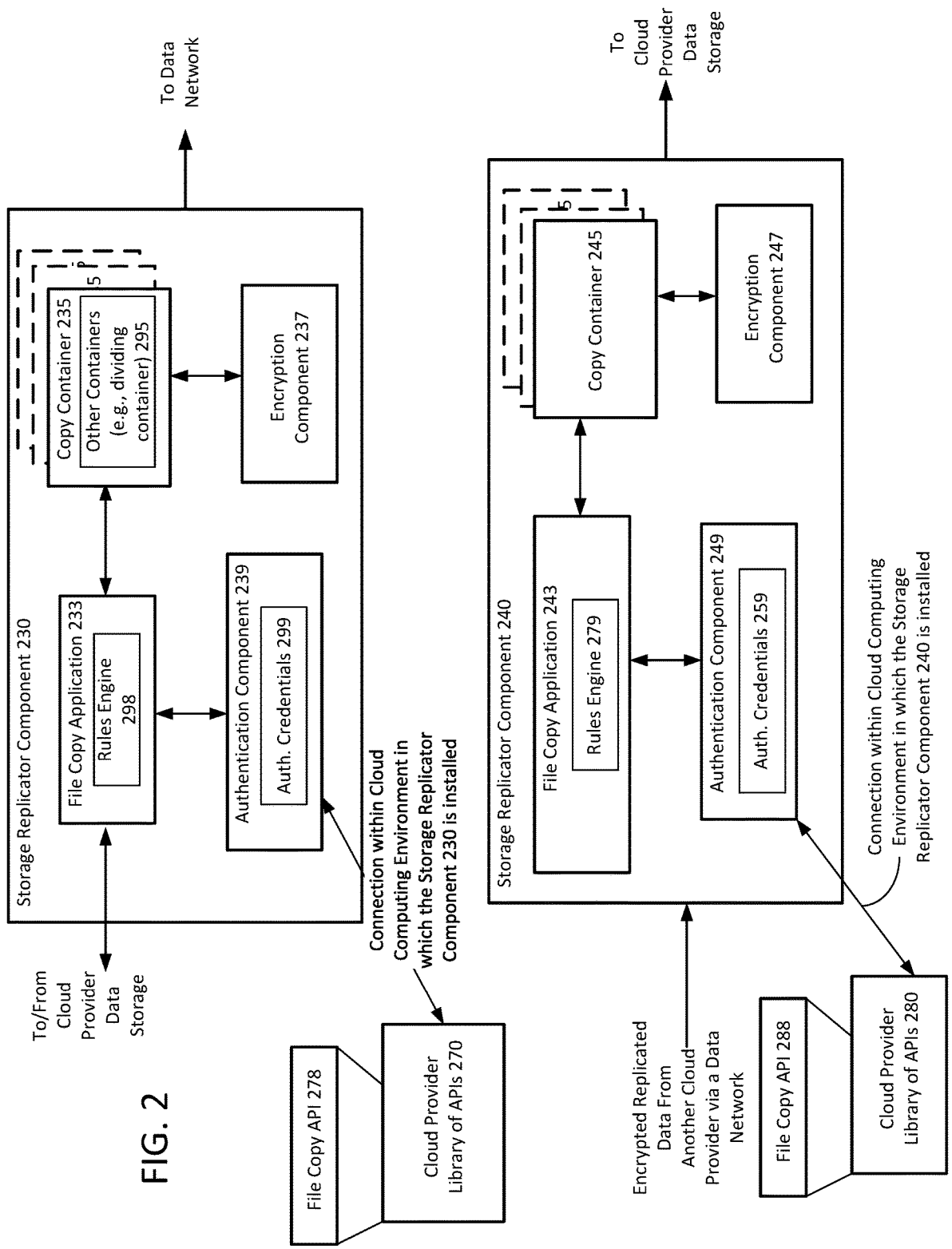
FIG. 2 illustrates an example of an apparatus operable to provide data replication functions within a cloud computing platform.

FIG. 2 illustrates an example of storage replication components 230 and 240 operable to provide data replication functions. Each of the storage replicator components 230 and 240 is associated with a customer and is uploaded to the respective cloud computing platform for execution by the customer and provides services for the customer. Each storage replication component 230 and 240 are located at different cloud computing platforms from one another, or alternatively, one of the storage replication components 230 or 240 may be at a customer network platform while the other is a cloud computing platform. When located in a cloud computing platform, the respective storage replicator components 230 and 240 may be operable to execute as a serverless functions operable to provide data replication services on a respective cloud computing platform. For example, storage replicator component 230 may be located in a first computing platform, such as 123, while storage replicator component 240 may be located in a second cloud computing platform, such as 125. The data replication services may include copying the data requested to be copied at a first cloud computing platform (such as 123) or receiving data that has been copied from the first-cloud computing platform (such as 123) and uploading the copied data to a second (or another) cloud computing platform (such as 125), or both.

The storage replication components 230 and 240 may, respectively, include elements such as a file copy application 233, 243, a copy container 235, 245, and an encryption component 237, 247 that together enable replicating data obtained on one cloud computing platform and transferring the copied data to other cloud computing platforms.

The respective file copy applications 233, 243 in respective storage replicator components 230, 243 may be computer programs that execute as a serverless function operable to perform a number of functions in their respective cloud computing platform. For example, the file copy application 233 may monitor for events related to the customer's data files stored in a particular cloud provider's data storage, such as cloud provider data storage 157 of cloud computing platform 127, and in response to the detection or determination of an occurrence of an event, may initiate a data replication response to the occurrence of an event. The file copy application 233, 243 may also include a rules engine 298, 279, respectively, that is operable to evaluate attributes of the data file to be copied to determine whether the data file attributes must be modified according to conventions for the cloud computing platform to which the data file is to be replicated. The rules engine 298 or 279 may be computer code that is operable to identify modifications that need to be made to a data file stored in one cloud computing platform to be saved in another cloud computing platform. For example, file name formats or the like may be different between two cloud computing platforms.

In addition to the rules engine 298, the file copy application 233 may access other computer programs for services or to perform functions, such as the copy container 235 and authentication component 239 that includes authentication credentials 299. The file copy application 233 may, for example, initiate a copy container 235, which is a computer program operable to copy any data files identified as being related to the occurrence of the event. In an example, the data files to be copied may be treated as offsite copies which allows copying of parts of the file in an order that is more efficient. This is in contrast to real-time copying which requires data to be transferred in a predetermined order, regardless of transport efficiency.

Depending upon the size of the identified data file or files, multiple instances of the copy container 235 may be instantiated by the storage replicator component 230 to operate in parallel to copy the identified data file or data files. For example, the first respective storage replicator component 230 is further operable to determine a size of the data file. In response to the determined size of the data file exceeding a predetermined size threshold (such as 250 gigabytes, 1 terabyte or the like), the first respective storage replicator component 230 may instantiate a number of different containers of programming code.

Moreover, the storage replicator component 230 via the copy container 235 may be able to instantiate other containers 295, such as a dividing container, that is operable to efficiently divide the data file to be copied amongst the number of copy containers instantiated to copy the data file in parallel. For example, an instantiated dividing container 295 may divide the data file to be copied into chunks of data, and a respective copy container that may be assigned to a respective chunk of the chunks of data. Each respective copy container may be operable to replicate an assigned respective chunk of data. Each respective copy container may modify is assigned respective chunk of data. The modified respective chunk of data may be provided to the first respective storage replicator component to be forwarded to the second respective cloud computing platform. The first respective storage replicator component 230 may either queue the chunk of modified data until the complete data file to be copied has been copied and modified or may send each modified chunk to the second respective cloud computing platform where the chunks of modified data may be put back together for decryption and storage in the second cloud computing platform.

The file copy application 233 may, for example, be operable to initiate contact, via a connection within the cloud computing platform in which the storage replicator component resides, with a cloud provider library of APIs, such as 270. The cloud provider library of APIs 270 may contain a file copy API 278 that enables the storage replicator component 230 to copy specified data files within the cloud provider data storage. However, use of some APIs, such as the file copy API 278, within the cloud provider library of APIs 270 may require authentication of the computer program, such as the storage replicator component 230 or file copy application 233, requesting use of the APIs in the library of APIs 270. In such cases, the storage replicator component 230 may utilize the authentication component 239 to perform the authentication function. For example, the authentication component 239 may have one or more authentication credentials associated with the customer. Upon successful authentication, the authentication component 239 may report the successful authentication to the file copy application 233. In response to the successful authentication, the file copy application 233 may instantiate the copy container 235 to copy the data files related to the triggering event.

As the copy container 235 or containers complete the copying of the data file, the copied data file may be encrypted by the encryption component 237. In some circumstances, even if the data file is encrypted prior to being copied, the copied data file containing previously-encrypted data is further encrypted by encryption component 237. The encryption applied by encryption component 237 may be according to an encryption algorithm from the SHA-2 family of cryptographic hash function. The encrypted copy of the data file may be forwarded to another cloud computing platform for storage or processing. The encrypted copy of the data file may be received by another storage replicator component 240 executing on the other cloud computing platform.

The storage replicator component 240 may be an example of a storage replicator component that executes in a second (or another) cloud computing platform. As shown, the storage replicator component 240 may receive encrypted replicated data from another cloud provider via a data network, such as data network 110 of FIG. 1. The storage replicator component 240 may include components similar to those in storage replicator component 230. For example, storage replicator component 240 may include a file copy application, a copy container 245, an authentication component 249 that includes authentication (Auth.) credentials 259, and an encryption component 247. The authentication component 249 may provide the authentication credentials 259 to APIs, such as a file copy API 288 in the cloud provider library of APIs 280. The encryption component 247 may also be operable to not only encrypt data but also decrypt an encrypted copy of the data file received from another storage replicator component, such as 230. More detailed operational examples of the storage replication components 230 and 240 are explained below with reference to FIG. 3.

Figure 3:
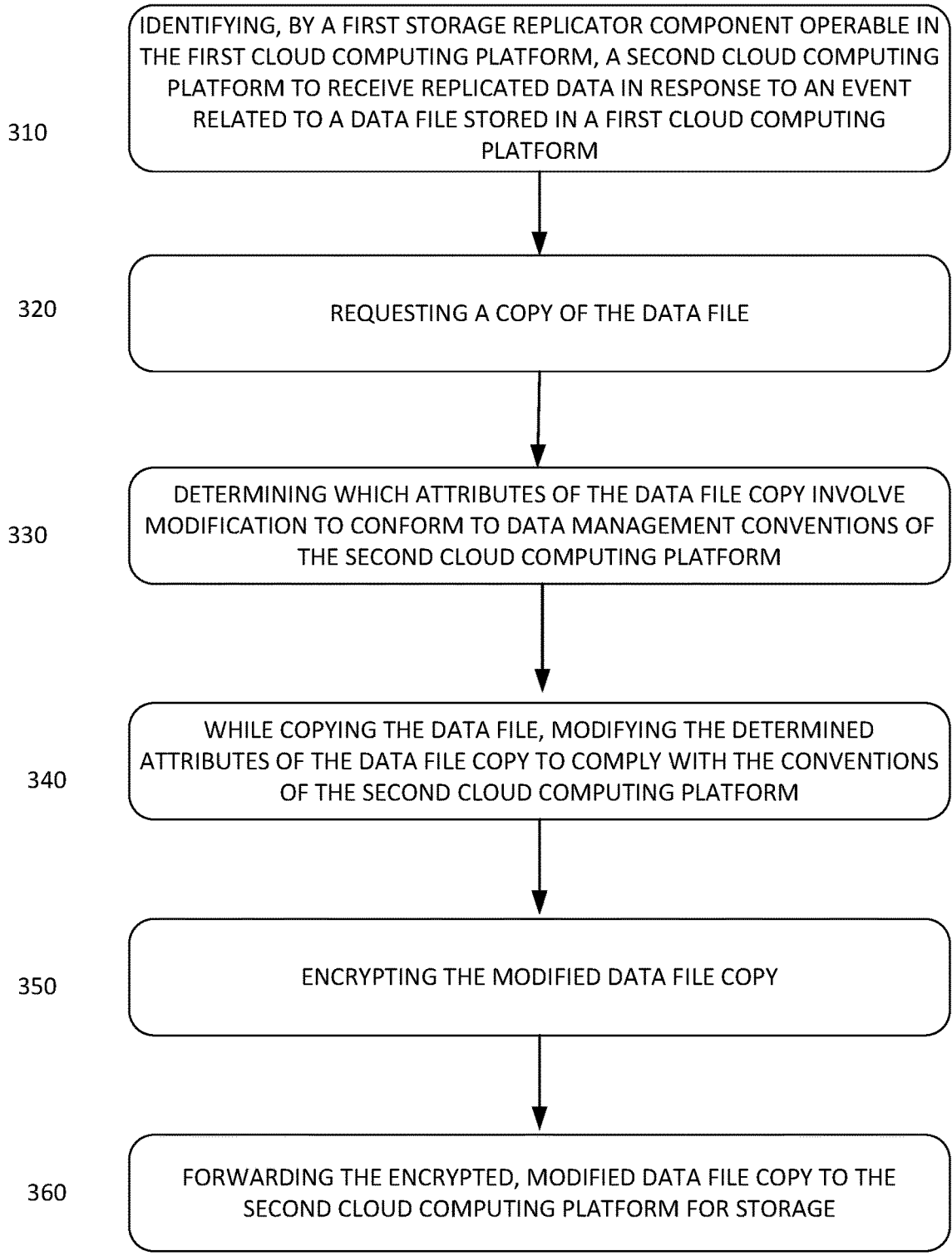
FIG. 3 shows a flow chart of an example of a process for copying data and transferring the copied data to other cloud computing platforms.

FIG. 3 illustrates an example of a process that utilizes a storage replicator component executing in a first cloud computing platform and a second storage replicator component executing in a second cloud computing platform.

In an example prior to the start of process 300, each storage replicator component, such as 230 and 240 may monitor customer data files in the respective cloud data storage of the cloud computing platform in which the respective storage replicator component is installed. For example, a first storage replicator component in a first cloud computing platform may monitor a customer's data files for an occurrence of an event, such as those mentioned above, that triggers the replication of the particular data files affected by the event. The first storage replicator component may act upon determining or detecting an event related to a customer's data file. The event may, for example, indicate a change to an attribute of the data file. Examples of events include at least one of when a data file is created, a data file is updated, a data file is modified, a data file is sent to a bucket for storage, an indication of a need to load balance between the first cloud computing platform and the second cloud computing platform, or the like. For example, based on the event, the first storage replicator component may determine that the data file is to be replicated to a second respective cloud computing platform.

Continuing with the example in FIG. 3, the first storage replicator component may identify a second cloud computing platform to receive replicated data in response to the event related to the data file stored in the first cloud computing platform (310). More specifically, the second cloud computing platform may be identified and selected from the number of cloud computing platforms based on the event being of a particular event type. An event type may be, for example, a change to the data within the data file, a modification to the permissions to access or edit the data file, a change in the metadata, or the like. Alternatively, or in addition, the second cloud computing platform may be identified selected from the number of cloud computing platform based on a status of the data file related to the event. For example, a data file status may be critical (e.g., related to operations of the customer network platform or the like), sensitive (e.g., related to customer's clients or users) and regulatory-related (e.g., the data relates to governmental regulations and statutes, such as Security Exchange Commission, Federal Communications Commission or the like).

At 320, the first storage replicator component, via an API of the first cloud computing platform (e.g., file copy API 278 in FIG. 2) request a copy of the data file due to the determined or detected event. The request for a copy of the data file may be a call by the copy file application for a file copy API, such as 233 and 278 in FIG. 2, in the cloud provider library of APIs, such as 270 of FIG. 2 of the first cloud computing platform.

In addition, as part of step 320, the APIs in the cloud provider API library typically require authentication credentials before the API permits its use by an application. Therefore, for example, the file copy application 233 within the first storage replicator component 230 of FIG. 2 may call or access the authentication component 239 to obtain one or more authentication (Auth.) credentials 299 of the customer associated with the first storage replicator component 230. Using the one or more authentication credentials 299, the storage replicator component 230 may authenticate the customer as being permitted to copy the data file in the first cloud computing platform based on the authentication credentials 299. Upon successful authentication, the file copy application 233 may continue processing the request to copy the data file.

Each data file may include at least one attribute, such as content of the data file, a filename of the data file, a data file metadata format, a size of the data file or the like. The attributes of the copy of the data file which involve modification to conform to data management conventions or the other formatting requirements of the second cloud computing platform may be determined (330). The determination of which attributes of the copy of the data file involve modification, at 330, may be performed, for example, by a rules engine, such as rules engine 298 or 299 of FIG. 2. An attribute may involve modification if the attribute does not conform to the data management conventions or other formatting requirements of the cloud computing platform to which the data file is being replicated (i.e., copied).

In an example, the rules engine 298 of the storage replicator component 230 may be provided with an identifier of the second cloud computing platform (e.g., 125 of FIG. 1 or the cloud computing platform in which storage replicator component 240 is located). In response to providing the identifier of the second cloud computing platform, the rules engine may retrieve attribute rules related to the second cloud computing platform. For example, the attribute rules for a number of different cloud computing platforms, such as 123, 125 and 127 of FIG. 1, may be stored in a data storage within a respective cloud computing platform that is accessible to a respective storage replicator component. The attribute rules may be processed to determine which attributes of the copy of the data file involve modification to conform to the attribute rules related to the second cloud computing platform. For example, when the processing of the attribute rules is completed, the attributes of the copy of the data file determined to involve modification are output.

As the data file is being copied, the determined attributes of the copy of the data file output from the rules engine may be modified by the storage replicator component, such as 230, or components thereof, such as copy container 235 to comply with the conventions of the second cloud computing platform (340). For example, the data in the data file may be copied and any attributes related to the data file, such as metadata, data format, file name conventions or the like, may be modified as the data file is being copied.

The modified copy of the data file may be encrypted (350) prior to being forwarded to the second cloud computing platform for storage. As mentioned above, the encryption may be performed according to any known encryption algorithms. At 360, the encrypted, modified copy of the data file may be forwarded in a transmission to the second cloud computing platform for storage. In addition, the transmission to the second cloud computing platform may include in addition to the encrypted, modified copy of the data file, a request for an application programming interface of the second cloud computing platform that is compatible with the file copy application programming interface in the first cloud computing platform.

The second cloud computing platform may, for example, include a second storage replicator component, such as 240 of FIG. 2, that executes in the second cloud computing platform. An example of a process performed by the second cloud computing platform in response to receiving the encrypted, modified copy of the data file is illustrated in FIG. 4. In the example process 400, the second storage replicator component may perform functions such as receiving the encrypted modified data file forwarded from the first cloud computing platform (410) via a data network, such as data network 110 of FIG. 1. In response to receiving the modified data file, the second respective storage replicator component may authenticate the first storage replicator component of the first cloud computing environment via an application programming interface of the second cloud computing platform as an application, component or entity that is authorized to copy data to second cloud computing platform (420). The authentication may be performed, for example, by a second file copy application using authentication credentials accessible by an authentication component or the like. Upon successful authentication, the encrypted modified copy of the data file forwarded from the first cloud computing platform may be decrypted (430). After the encrypted modified copy of the data file is decrypted, the modified data file may be stored in a data storage of the second respective cloud computing platform (440). The file copy application may forward a message to the customer network platform indicating the modified data file was successfully stored in the second cloud computing platform (450). The forwarded message may include data relevant to the modified data file, such as modified file name, modified metadata, other information or data related to the modifications made to data file attributes due to the data storage conventions, a location within the data storage of the second cloud computing device or the like.

Figure 5:
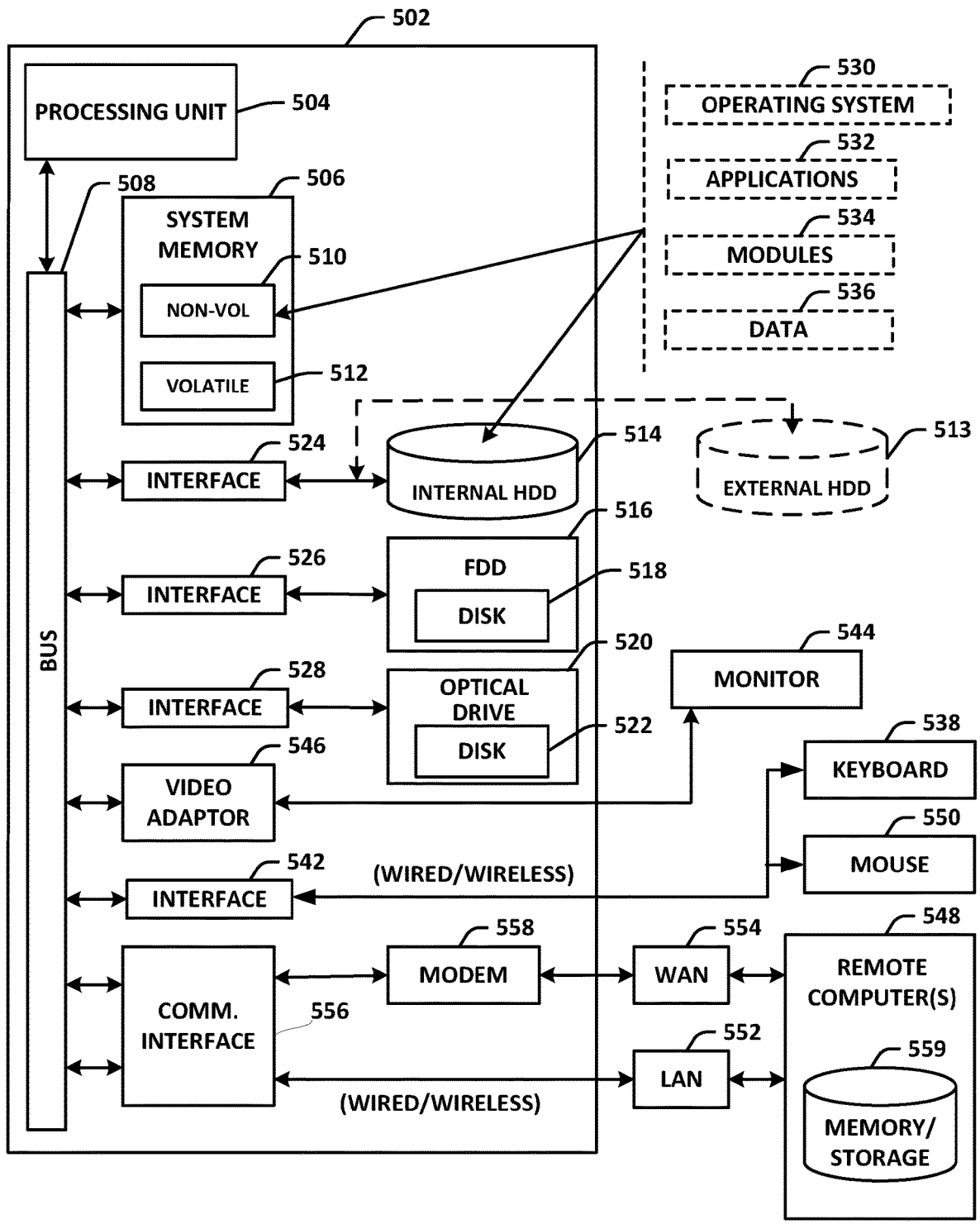
FIG. 5 illustrates an example of a computing architecture suitable for implementing the examples illustrated in FIGS. 1-4.

FIG. 5 illustrates an example of an exemplary computing architecture 500 suitable for implementing various examples as previously described. In one example, the computing architecture 500 may include elements of or be implemented as part of system 100 of FIG. 1.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 500.

As shown in FIG. 5, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal hard disk drive (HDD) 514 (or external hard disk drive (HDD) 513), a magnetic floppy disk drive (FDD) 516 to read from or write to a removable magnetic disk 518, and an optical disk drive 520 to read from or write to a removable optical disk 522 (e.g., a CD-ROM or DVD). The internal HDD 514 or external HDD 513, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 510, 512, including an operating system 530, one or more application programs 532, other program modules 534, and program data 536. In one example, the one or more application programs 532, other program modules 534, and program data 536 can include, for example, the various applications and/or components of the computing architecture 500.

A user can enter commands and information into the computer 502 through one or more wire/wireless input devices, for example, a keyboard 538 and a pointing device, such as a mouse 550. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through communication interface 556 that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked platform using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all the elements described relative to the computer 502, although, for purposes of brevity, only a memory/storage device 559 is illustrated. The logical connections depicted include wire/wireless connectivity to a local area network (LAN) 552 and/or larger networks, for example, a wide area network (WAN) 554. Such LAN and WAN networking platforms are commonplace in offices and companies, and facilitate enterprise-wide computer networks, such as intranets, all of which may connect to a global communications network, for example, the Internet.

When used in a LAN networking platform, the computer 502 is connected to the LAN 552 through a wire and/or wireless communication interface 556. The communication interface 556 can facilitate wire and/or wireless communications to the LAN 552, which may also include a wireless access point disposed thereon for communicating with the wireless functionality of the communication interface 556.

When used in a WAN networking platform, the computer 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the input device interface 542. In a networked platform, program modules depicted relative to the computer 502, or portions thereof, can be stored in the memory/storage device 559. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

At least one computer-readable storage medium may include instructions that, when executed, cause a system to perform any of the computer-implemented methods described herein.

Some examples may be described using the expression "one example" or "an example" along with their derivatives. These terms mean that a particular feature, structure, or characteristic described in connection with the example is included in at least one example. The appearances of the phrase "in one example" in various places in the specification are not necessarily all referring to the same example. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations.

Some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

As used in this application, the terms "system" and "component" are intended to refer to a computer-related entity, either hardware, a combination of hardware and software, software, or software in execution, examples of which are provided by the examples in FIGS. 1-5. For example, a component can be, but is not limited to being, a process running on a processor, a processor, a hard disk drive, multiple storage drives (of optical and/or magnetic storage medium), an object, an executable, a thread of execution, a computer program, and/or a computer. By way of illustration, both an application running on a server or processor and the server or processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Various examples also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method, comprising:
    identifying, by a first storage replicator component of a first cloud computing platform, a second cloud computing platform to receive replicated data;
    determining, by a rules engine, attributes of the replicated data that require modification to replicate on the second cloud computing platform;

modifying the attributes of the replicated data to comply with conventions of the second cloud computing platform;

encrypting the replicated data modified to comply with the conventions; and communicating the encrypted replicated data to the second cloud computing platform for storage.

2. The method of claim 1, wherein the attributes of the replicated data include at least one of content of the replicated data, a filename of the replicated data, data file metadata format for the replicated data, a size of the replicated data, or a combination thereof.

3. The method of claim 1, comprising:
determining an identifier corresponding to the second cloud computing platform;
providing, via an application programming interface (API), the identifier to the rules engine to determine the attributes.

4. The method of claim 1, wherein the rules engine is located on the first cloud computing platform.

5. The method of claim 1, further comprising:
in response to an event being of a particular event type, selecting the second cloud computing platform from a plurality of cloud computing platforms coupled to a customer network platform, wherein the event is one of when a file is created, a file is updated, a file is modified, a file is sent to a bucket for storage, an indication of a need to load balance between the first cloud computing platform and the second cloud computing platform.

6. The method of claim 1, further comprising:
determining a size of the replicated data;
in response to the size of the replicated data exceeding a predetermined size threshold, instantiating a dividing container operable to divide the replicated data into chunks of replicated data;
modifying each chunk of replicated data to modify the attributes for the replicated data; and
encrypting each chunk of replicated data to encrypt the replicated data.

7. The method of claim 1, wherein the replicated data is a copy of data stored on the first computing platform, and the attributes of the replicated data are modified while the replicated data is being copied from the data.

8. A system, comprising:
memory configured to store instructions of a first cloud computing platform; and
one or more processors coupled with the memory configured to execute the instructions, that when executed, cause the one or more processors to:
identify a second cloud computing platform to receive replicated data;
determine attributes of the replicated data that require modification to replicate for the second cloud computing platform;
modify the attributes of the replicated data to comply with conventions of the second cloud computing platform;
encrypt the replicated data modified to comply with the conventions; and
communicate the encrypted replicated data to the second cloud computing platform for storage.

9. The system of claim 8, wherein the attributes of the replicated data include at least one of content of the replicated data, a filename of the replicated data, data file metadata format for the replicated data, a size of the replicated data, or a combination thereof.

10. The system of claim 8, the one or more processors to:
determine an identifier corresponding to the second cloud computing platform;
provide, via an application programming interface (API), the identifier to a rules engine to determine the attributes.

11. The system of claim 10, wherein the rules engine is located on the first cloud computing platform.

12. The system of claim 8, the one or more processors to select the second cloud computing platform from a plurality of cloud computing platforms coupled to a customer network platform, and wherein the one or more processors execute the instructions in response to an event, wherein the event is one of when a file is created, a file is updated, a file is modified, a file is sent to a bucket for storage, an indication of a need to load balance between the first cloud computing platform and the second cloud computing platform.

13. The system of claim 8, the one or more processors to:
determine a size of the replicated data;
in response to the size of the replicated data exceeding a predetermined size threshold, instantiate a dividing container operable to divide the replicated data into chunks of replicated data;
modify each chunk of replicated data to modify the attributes for the replicated data; and
encrypt each chunk of replicated data to encrypt the replicated data.

14. The system of claim 8, wherein the replicated data is a copy of data stored on the first computing platform, and the attributes of the replicated data are modified while the replicated data is being copied from the data.

15. A non-transitory computer readable medium comprising instructions for a first cloud computing platform that when executed by at least one processor causes the at least one processor to:
identify a second cloud computing platform to receive replicated data;
determine attributes of the replicated data that require modification to replicate for the second cloud computing platform;
modify the attributes of the replicated data to comply with conventions of the second cloud computing platform;
encrypt the replicated data modified to comply with the conventions; and
communicate the encrypted replicated data to the second cloud computing platform for storage.

16. The non-transitory computer readable medium of claim 15, wherein the attributes of replicated data include at least one of content of the replicated data, a filename of the replicated data, data file metadata format for the replicated data, a size of the replicated data, or a combination thereof.

17. The non-transitory computer readable medium of claim 15, the at least one processor to:
determine an identifier corresponding to the second cloud computing platform;
provide, via an application programming interface (API), the identifier to a rules engine to determine the attributes.

18. The non-transitory computer readable medium of claim 15, the at least one processor to select the second cloud computing platform from a plurality of cloud computing platforms coupled to a customer network platform based on an event, and wherein the event is one of when a file is created, a file is updated, a file is modified, a file is sent to a bucket for storage, an indication of a need to load balance between the first cloud computing platform and the second cloud computing platform.

19. The non-transitory computer readable medium of claim 15, the one or more processors to:
- determine a size of the replicated data;
- in response to the size of the replicated data exceeding a predetermined size threshold, instantiate a dividing container operable to divide the replicated data into chunks of replicated data;
- modify each chunk of replicated data to modify the attributes for the replicated data; and
- encrypt each chunk of replicated data to encrypt the replicated data.

20. The non-transitory computer readable medium of claim 15, wherein the replicated data is a copy of data stored on the first cloud computing platform, and the attributes of the replicated data are modified while the replicated data is being copied from the data.

* * * * *